United States Patent [19]

Kawano et al.

[11] 4,364,169

[45] Dec. 21, 1982

[54] METHOD OF PRODUCING A STATOR IRON CORE

[75] Inventors: Kenzi Kawano, Okazaki; Koichi Fukaya, Aichi; Keizou Jyoko, Okazaki, all of Japan

[73] Assignee: Nippondenso Co., Ltd., Kariya, Japan

[21] Appl. No.: 250,149

[22] Filed: Apr. 2, 1981

[30] Foreign Application Priority Data

Oct. 24, 1980 [JP] Japan ................................ 55-149814

[51] Int. Cl.³ ............................................ H02K 15/02
[52] U.S. Cl. ........................................ 29/596; 219/93; 310/216
[58] Field of Search .................. 29/596; 310/216, 217, 310/218; 219/93, 94, 91.23, 86.24, 150 R

[56] References Cited

U.S. PATENT DOCUMENTS

| | | | |
|---|---|---|---|
| 2,845,555 | 7/1958 | Carpenter et al. | 310/217 |
| 3,152,629 | 10/1964 | Rediger | 72/142 |
| 3,202,851 | 8/1965 | Zimmerle et al. | 310/217 |

FOREIGN PATENT DOCUMENTS 603175  8/1960 Canada ................................ 310/216

*Primary Examiner*—Francis S. Husar
*Assistant Examiner*—P. W. Echols
*Attorney, Agent, or Firm*—Cushman, Darby & Cushman

[57] ABSTRACT

An iron core for a rotary electric machine suitable for use as stator iron cores of AC generators for vehicles, for example, winding an iron core blank of strip form and joining convolutions of the spirally wound iron core blank together by electric resistance winding. The spirally wound iron core blank has a plurality of circumferentially spaced apart projections on one surface and a plurality of circumferentially spaced apart recesses on the other surface in positions corresponding to the projections on the one surface. The projections and recesses coincide in position when the iron core blank is spirally wound and convolutions thereof are superposed one above another. The provision of the projections and recesses enables winding of the iron core blank into a spiral form and welding of the convolutions of the spirally wound iron core blank to be effected economically and with increased accuracy.

3 Claims, 7 Drawing Figures

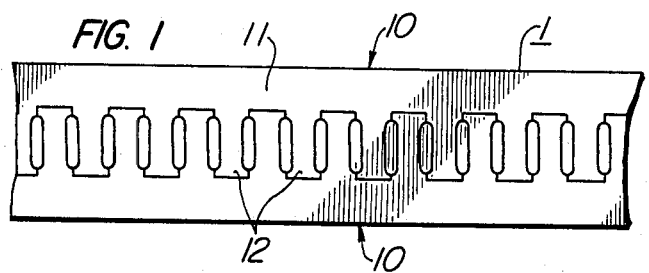
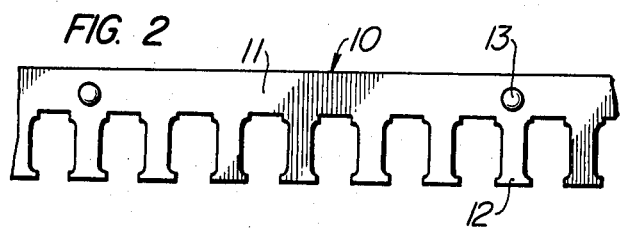
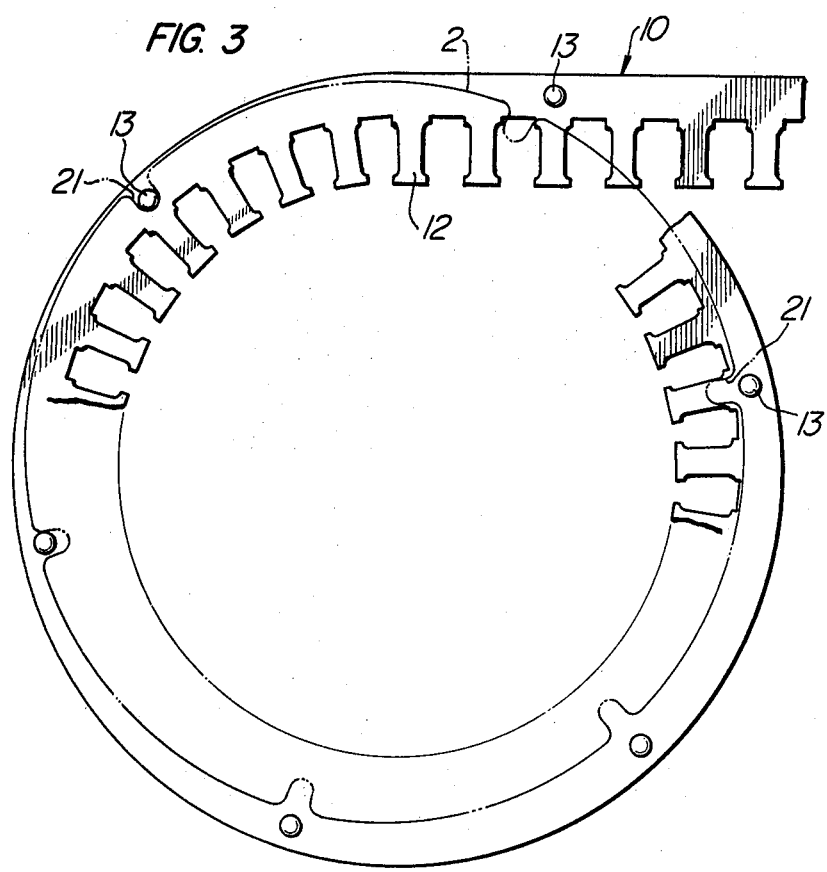

METHOD OF PRODUCING A STATOR IRON CORE

BACKGROUND OF THE INVENTION

This invention relates to iron cores for rotary electric machines suitable for use as stator iron cores of AC generators for vehicles, for example, and more particularly it is concerned with what is generally referred to as a wound iron core formed by spirally winding a strip of iron core blank and joining its convolutions together by electric resistance welding. More specifically, the invention relates to a wound iron core and a method of producing same which is formed thereon with improved projections and recesses that enable an iron core blank to be spirally wound and its convolutions to be superposed one above another and welded together with accuracy and precision and in good condition.

A wound iron core is known which is produced by winding a strip of iron core blank formed with a plurality of teeth into a spiral form while subjecting same to plastic deformation and by joining its convolutions together by welding. It is widely known that the use of wound iron cores reduces the amount of sheet steel for the production of iron cores as compared with the use of iron cores of the ordinary type which are each produced by superposing one over another a plurality of annular iron core blanks produced by blanking directly from sheet steel. However, it is also known that difficulties are encountered in positively and precisely winding an iron core blank of strip form in a spiral form and accurately superposing the convolutions one above another in such a manner that the teeth of the adjacent convolutions coincide with one another. Thus it is necessary to satisfactorily solve this problem to put a wound iron core to practical use.

As a method for solving this problem, proposals have been made to utilize the teeth of an iron core blank for winding the blank and positioning the convolutions when they are superposed one above another. It has also been proposed to provide an iron core blank with a plurality of projections extending radially outwardly and spaced apart from one another a suitable spacing interval, such projections being disposed on an edge portion (outer edge portion) of the iron core blank opposite the teeth thereof so that the projections can be used for winding the blank and superposing the convolutions one above another. Some disadvantages are associated with these methods of the prior art. In the former, each of the teeth of an iron core blank might be deformed by a force exerted thereon when the blank is spirally wound. In the latter, the projections would increase the width of the iron core blank, causing the material to be wasted. With these disadvantages, the methods that have hitherto been known for solving the problem are not considered satisfactory, and it has been earnestly desired that some other effective method be developed for obviating the problem.

SUMMARY OF THE INVENTION

Accordingly, this invention has as its object the provision of a wound iron core and a method of producing same wherein a blank can be positively and economically wound into a spiral form and the convolutions can be superposed one above another and joined together by welding with accuracy.

The aforesaid object can be accomplished according to the invention by forming a plurality of projections on one surface of an iron core blank in strip form and a plurality of recesses on the other surface thereof in positions in which one of the projections coincides with one of the recesses when the iron core blank is spirally wound and its convolutions are superposed one above another.

The above and further objects and novel features of the invention will more fully appear from the following detailed description when the same is read in connection with the accompanying drawings. It is to be expressly understood, however, that the drawings are for purposes of illustration only and are not intended as a definition of the limits of the invention.

BRIEF DESCRIPTION OF THE DRAWINGS

FIG. 1 is a plan view of an iron core blank for producing an iron core for a rotary electric machine according to the invention, showing the iron core blank formed by blanking;

FIG. 2 is a plan view of the iron core blank shown in FIG. 1, showing the projections for welding formed on its surface;

FIG. 3 is a front view of the iron core blank showing the manner in which the blank is wound in a spiral form;

DETAILED DESCRIPTION OF THE PREFERRED EMBODIMENT

Figure 4:
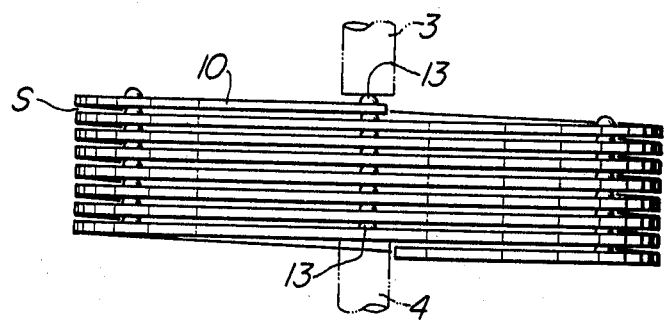
FIG. 4 is a front view showing the iron core blank wound spirally in convolutions.

One embodiment of the invention will now be described by referring to the accompanying drawings.

Referring to FIG. 1, iron core blanks 10 in strip form are produced by blanking from a steel strip 1. The iron core blank 10 is in the form of a comb as shown in FIG. 2 and includes a base portion 11 and a plurality of teeth 12 projecting widthwise from one side of the base portion 11 and having a predetermined spacing interval. When such iron core blank 10 is produced, two blanks 10 are simultaneously formed from the steel strip 1 as shown in FIG. 1 by blanking, so that the teeth 12 of the two blanks 10 are disposed in staggered relation to avoid waste of the material.

As shown in FIG. 2, the iron core blank 10 is formed on one surface thereof with a plurality of projections 13 disposed perpendicular to the plane of the base portion 11 and spaced apart from one another a predetermined distance, and on the other surface thereof with a plurality of recesses 14, not shown, disposed perpendicular to the plane of the base portion 11 and located in positions coinciding with the positions of the projections 13 on one surface of the base portion. The process for forming the projections and recesses is subsequently to be described in detail. In the embodiment shown, the projection 13 (recess) is located at every sixth tooth 12 at its root.

Referring to FIG. 3, the iron core blank 10 formed with the projections 13 and recesses are wound in a spiral form while being subjected to plastic deformation, with the teeth 12 being disposed on the inner side of each convolution. In winding the blank 10, a winding ring 2 formed at its outer periphery with a plurality of notches 21 adapted to receive the projections 13 therein is used. Thus as the winding ring 2 is arranged on one side of the iron core blank 10 and rotated after the projections 13 are fitted in the notches 21, a winding force is exerted on the projections 13. At this time, a pusher is disposed on the other side of the ring 2 and presses thereagainst, so as to hold the winding ring 2 between the iron core blank 10 and the pusher, not shown, while the iron core blank 10 is guided at its outer and inner sides by outer and inner rings respectively. The outer and inner rings rotate together with the winding ring 2 and contribute to the winding of the iron core blank 10, although the main winding force is applied by the winding ring 2 to the projections 13 to wind the iron core blank 10 in a spiral form. The notches 21 of the winding ring 2 are six in number in the embodiment shown and described herein which successively receive the projections 13 of the iron core blank 10 as the ring 2 is rotated. Thus the iron core blank 10 is wound in a spiral form in such a manner that its convolutions each have six projections 13 (or thirty-six teeth 12).

The iron core blank 10 spirally wound as described hereinabove is cut in a suitable position, to provide a plurality of convolutions superposed one above another as shown in FIG. 4. In arranging the convolutions of the spirally wound iron core blank 10 as aforesaid, the convolutions are positioned relative to one another such that the six projections 13 of each convolution are inserted in the recesses 14 of the adjacent convolution, so that the teeth 12 of the convolutions coincide with one another. The adjacent convolutions are spaced apart from one another by a clearance S to prevent shunting of a welding current when the adjacent convolutions are joined together by electric resistance welding (welding of the projections) as presently to be described.

The convolutions of the spirally would iron core blank 10 superposed one above another as shown in FIG. 4 are joined together by electric resistance welding by passing a current between electrodes 3 and 4 pressing against the projections 13 of the uppermost convolution and the undersurface of the lowermost convolution, respectively.

Following welding, the upper and lower surfaces of the convolutions of the iron core blank 10 are finished to provide flat and parallel surfaces, to provide a completed wound iron core.

In producing the wound iron core according to the invention, the projections 13 indispensable to joining the convolutions of the blank 10 to one another by electric resistance welding and the recesses 14 coincident with the projections 13 in position serve as means for bearing a welding force when the iron core blank 10 in strip form is spirally wound while being subjected to plastic deformation, and as means for positioning the convolutions of the spirally wound iron core blank 10 so as to bring the teeth 12 of the convolutions into coincidence with one another when the convolutions are superposed one above another. In this method, no external force is directly exerted on the teeth 12 when the strip of iron core blank 10 is wound spirally and the convolutions of the spirally wound blank 10 are superposed one above another, so that deformation of the teeth 12 can be avoided. Moreover, the need to provide radially outwardly extending projections as described in the background of the invention for bearing a winding force and for positioning the convolutions of the blank 10 can be eliminated, thereby avoiding waste of the material. By using the method according to the invention, a strip of iron core blank can be wound spirally in good condition and the convolutions of the spirally wound blank can be accurately positioned to bring the teeth of the convolutions into coincidence with one another, so that the wound iron core obtained has high quality.

Figure 5:
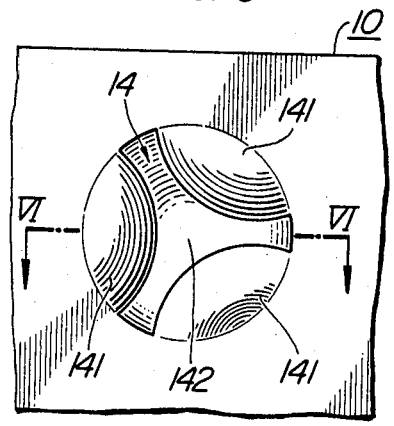
FIG. 5 is a plan view showing one example of the recess formed in the iron core blank according to the invention.
Figure 6:
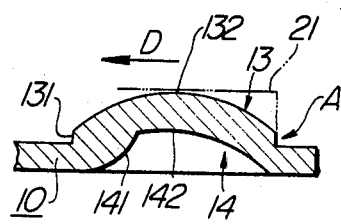
FIG. 6 is a sectional view taken along the line VI—VI in FIG. 5.

The projections and the recesses formed on the iron core blank 10 have the construction shown in FIGS. 5 and 6.

More specifically, each projection 13 is formed at the outer periphery of its base with a straight portion 131 which is perpendicular to one surface of the iron core blank 10. The projection 13 is formed at its top with a convex surface portion 132. The straight portion 131 is the portion which bears a winding force which is exerted on the projection 13 when the strip of iron core blank 10 is spirally wound. Thus the straight portion 131 may be disposed only at one side of the base of the projection 13 which is located at the posterior end of the projection with respect to the direction in which the blank 10 is wound as indicated by an arrow D, or a portion A at which the winding force is applied. However, in the embodiment shown and described herein, the straight portion 131 is provided to the entire periphery of the base of the projection 13. The straight portion 131 has a height which is selected to be in the range between $\frac{1}{2}$ and $\frac{1}{3}$ the height of the projection 13.

Meanwhile in each recess 14, bulges 141 are formed on the otherwise concave surface portion of the recess 14 to partially reduce the depth of the recess 14. The bulges 141 have the function of regulating the entry of the corresponding projection 13 of the adjacent convolution in the recess 14 when the convolutions of the spirally wound iron core blank 10 are superposed one above another, to ensure that the aforesaid clearances S is maintained between the adjacent convolutions. In addition, the bulges 141 have other functions. More specifically, the bulges 141 have the function of bringing the center of the convex surface portion 132 of the projection 13 inserted in the recess 14 and the center of the recess 14 into alignment with each other axially of the iron core, and the function of reinforcing the projection 13 on the opposite surface of the iron core blank 10. To this end, the bulges 141 are three in number and located equidistantly at the edge of the inner surface of the recess 14. The bulges 141 are each convexly shaped such that its height is reduced in going toward the center 142 of the recess 14. By the provision of the three bulges 141, the recess 14 takes the form of a letter Y in plan view which is defined by the bulges 141.

The projections 13 and the recesses 14 of the aforesaid shape can be formed as follows. A cylindrical die having an inner diameter equal to the outer diameter of the straight portion 131 is pressed against one surface of an iron core blank 10 on which the projections 13 are to be formed, and a punch having cavities corresponding to the bulges 141 is pressed against the other surface of the iron core blank 10 at which the recesses 14 are to be formed, to thereby simultaneously form the projection 13 and the recess 14.

When the projections 13 having the straight portions 131 are caused to bear a winding force, the winding force applied by the winding ring 2 as the strip of iron core blank 10 is spirally wound as shown in FIG. 3 positively acts on the straight portions 131 in a direction which coincides with the winding direction, so that winding of the iron core blank 10 can be effected in good condition without causing slipping or deforming of the blank 10. The three bulges 141 formed in each recess 14 can prevent the straight portion 131 of the projection from being deformed by their bridging action. Thus the winding of the strip of iron core blank 10 performed by applying a winding force on the straight portions 131 of the projections 13 can achieve better results in producing a wound iron core.

Figure 7:
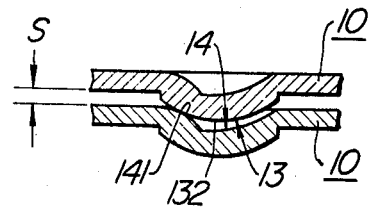
FIG. 7 is a sectional front view showing the manner in which the convolutions of the spirally wound iron core blank formed with the recesses (projections) are superposed one above the other.

With the recesses 14 each having the bulges 141, the entry of the projections 13 on the convolution into the recesses 14 on the adjacent convolution can be regulated in amount as shown in FIG. 7 when the convolutions of the spirally wound iron core blank 10 are superposed one above another, to ensure that the predetermined clearances S are defined between the convolutions for effecting electric resistance welding. Cooperating with the convex forward end portion 132 of each projection 13, the three convex bulges 141 of each recess 14 enables alignment of the centers of the mating projection 13 and recess 14 to be achieved. Thus positioning of the convolutions of the iron core blank 10 can be effected accurately to bring the teeth 12 of the convolutions into coincidence with one another when the convolutions are superposed one above another.

The three bulges 141 formed in each recess 14 increase the strength of the projection 13 on the opposite side of the recess 14. In carrying out electric resistance welding, the opposite ends of the convolutions of the iron core blank 10 are pressed by the electrodes 3 and 4 with a force that acts on the projections 13 on each convolution. However, settling or buckling of the projections 13 is prevented because the projections are reinforced by the bulges 141, making it possible to positively keep out of contact with one another those portions of the convolutions which are not welded together. This enables welding of high quality to be effected because a clearance is maintained between the adjacent convolutions and shunting of the welding current can be avoided when a current is passed between the two electrodes.

The invention is not limited to the number of the bulges 141 (three) shown and described herein. It is to be understood that the advantages described can be offered if the bulges 141 are over three in number.

From the foregoing descriptions, it will be appreciated that the invention enables winding of a strip of iron core blank and positioning of the convolutions of a spirally wound iron core blank to be effected positively and accurately while carrying out welding in good condition by utilizing to good effect the projections and the recesses cooperating therewith which are essential to carrying out welding. The invention offers the advantage that a wound iron core of excellent quality for a rotary electric machine can be produced with minimized waste of sheet steel.

While a preferred embodiment has been described, variations thereto will occur to those skilled in the art within the scope of the present inventive concepts which are delineated by the following claims.

What is claimed is:

1. A method of production of an iron core for a rotary electric machine comprising the steps of:

forming an iron core blank of the comb shape having a plurality of teeth spaced apart from one another a predetermined distance and extending widthwise at one side of the iron core blank, said iron core blank being formed by blanking from steel strip in such a manner that two iron core blanks can be formed in one operation with the teeth of the two blanks being in staggered relationship;

forming a plurality of projections on said iron core blank, said projections each having a straight portion and being located on one surface of the iron core blank with said straight portion being perpendicular to said one surface, so that when said blank is spirally wound the projections are disposed equidistantly from one another circumferentially on each of the convolutions of the spirally wound iron core blank, while a plurality of recesses are formed on the other surface of said blank in positions corresponding to the projections on said one surface, said recesses each having a plurality of bulges in positions symmetrical in rotation with respect to the center of the recess;

winding said iron core blank with said projections and recesses into a spiral form by applying a winding force on said straight portion of each of said projections while subjecting the blank to plastic deformation, and superposing convolutions of the spirally wound blank one above another by inserting the projections in the recesses of the adjacent convolution while forming a clearance between the adjacent convolutions of the spirally wound iron core blank; and joining the convolutions of the spirally wound iron core blank together by electric resistance welding at the joints of said projections and said recesses of the adjacent convolutions.

2. A method of production of an iron core as claimed in claim 1, wherein said projections and said recesses are simultaneously formed by using a cylindrical die having an inner diameter equal to the outer diameter of said straight portion and pressed against the one surface of said iron core blank on which the projections are to be formed, and at the same time by bringing a punch having cavities corresponding to the bulges of the recess into pressing engagement with the other surface of said iron core blank.

3. A method of production of an iron core as claimed in claim 1, wherein said plurality of bulges formed in each of said recesses are at least three in number and shaped spherically in such a manner that they are located at the periphery of each recess and their height is progressively reduced in going toward the center of the recess, and the forward end portion of each of said projections is convex.

* * * * *